United States Patent [19]

Thigpen

[11] Patent Number: 5,438,956

[45] Date of Patent: Aug. 8, 1995

[54] DEVICE FOR DISPENSING BIRD SEED TO AN ELEVATED LOCATION

[76] Inventor: Michael Thigpen, 911 San Jacinto St., Lockhart, Tex. 78644

[21] Appl. No.: 130,796

[22] Filed: Oct. 4, 1993

[51] Int. Cl.6 ............................................. A01K 5/00
[52] U.S. Cl. ............................. 119/57.92; 198/801.5; 222/413
[58] Field of Search ............... 119/51.04, 57.91, 57.92; 198/657, 668, 671, 674, 861.5, 675; 222/412, 413, 414

[56] References Cited

U.S. PATENT DOCUMENTS

| | | | |
|---|---|---|---|
| 2,746,592 | 5/1956 | Wilcoxen | 198/657 |
| 2,782,903 | 2/1957 | Kennedy | 198/674 |
| 2,809,740 | 10/1957 | Scholz | 198/861.5 |
| 3,093,271 | 6/1963 | Douglas | 222/413 |
| 3,409,119 | 11/1968 | Mayrath | 198/671 |
| 3,533,500 | 10/1970 | Mayrath | 198/674 |
| 3,722,715 | 3/1973 | Young | 198/671 |
| 4,508,061 | 4/1985 | Swearingin | 198/861.5 |
| 4,739,868 | 4/1988 | Head | 198/861.5 |
| 5,033,508 | 7/1991 | Lorimor et al. | 198/674 |

Primary Examiner—Todd E. Manahan

[57] ABSTRACT

Apparatus for dispensing particulant material to an elevated location comprising an elongated tubular member having interior and exterior surfaces and a closed lower end and an open upper end with its peripheral surface forming an acute angle with respect to the axis of the tubular member to form a lower short side and a long upper side of the tubular member. An auger is mounted within the tubular member and secured to the axle for rotation therewith. A plate is mounted within the tubular member adjacent to the bottom thereof for rotatably receiving the lower end of the axle and a bearing member adjacent to the top of the tubular member for rotatably receiving the upper end of the axle. A motor is within the tubular member on the side of the plate remote from the auger adapted to rotate the axle and auger. Lastly, an opening is in the auger adjacent to the lower end thereof through the long side of the tubular member.

2 Claims, 3 Drawing Sheets

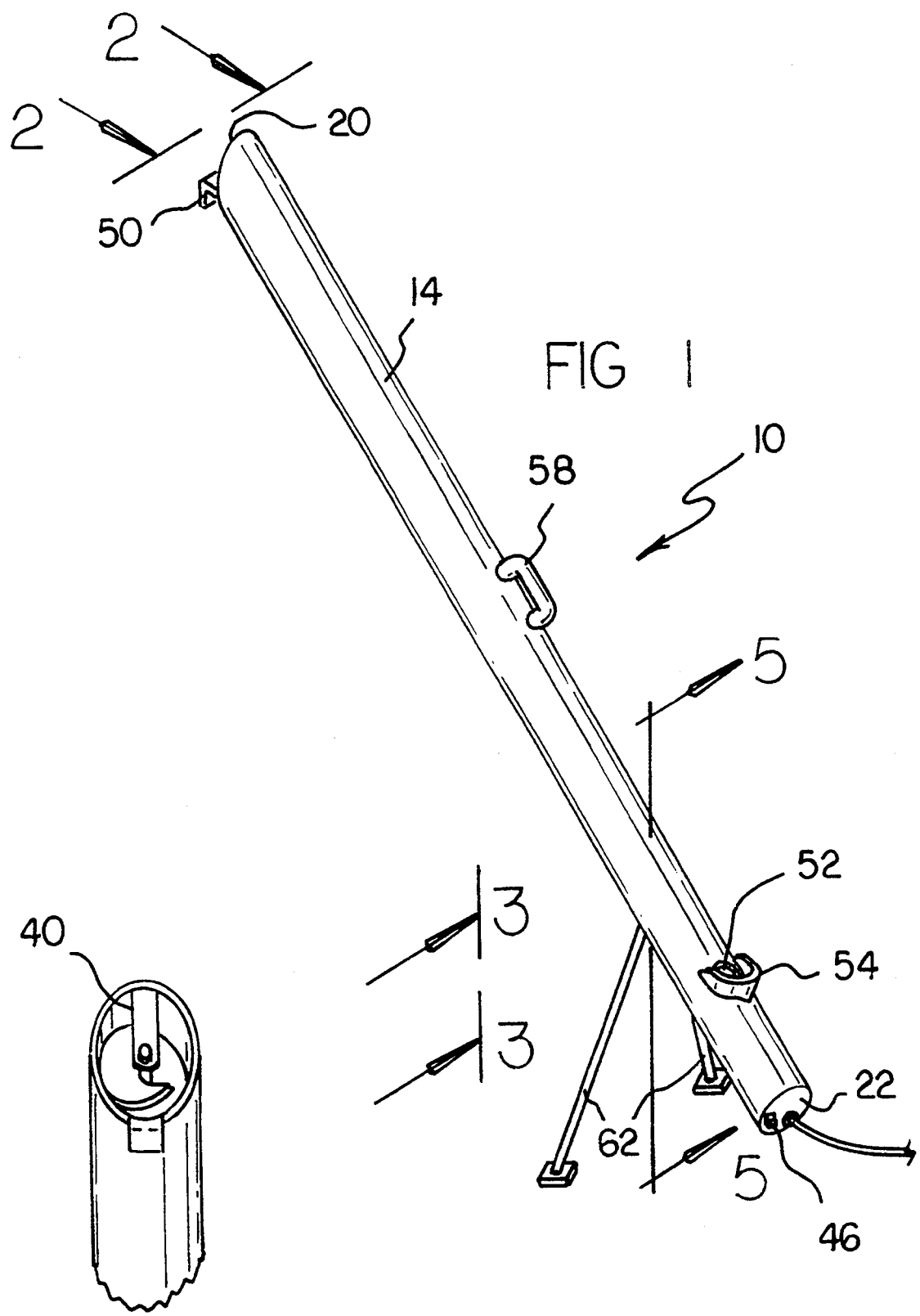

DEVICE FOR DISPENSING BIRD SEED TO AN ELEVATED LOCATION

BACKGROUND OF THE INVENTION

1. Field of the Invention

The present invention relates to device for dispensing bird seed to an elevated location and more particularly pertains to an auger which may be used for filling elevated bird feeders.

2. Description of the Prior Art

The use of devices for elevating granular material is known in the prior art. More specifically, augers heretofore devised and utilized for the purpose of conveying materials are known to consist basically of familiar, expected and obvious structural configurations, notwithstanding the myriad of designs encompassed by the crowded prior art which have been developed for the fulfillment of countless objectives and requirements.

Prior art structures for using augers to convey a wide variety of materials are disclosed in U.S. Pat. No. 4,739,868 to Head; U.S. Pat. No. 3,719,268 to Koehnen; U.S. Pat. No. 3,688,827 to Ryan; 3,769,988 to Burenga; U.S. Pat. No. 4,352,426 to Peterson and U.S. Pat. No. 4,895,274 to Morimoto.

While the prior art devices disclose structures for using augers for conveying particulate material with a wide variety of structure for a wide variety of functions, none employs its device for feeding bird seed to an elevated location and none discloses the specifics of the mechanisms disclosed herein.

Therefore, it can be appreciated that there exists a continuing need for new and improved augers which can be used to fill elevated bird feeders. In this regard, the present invention substantially fulfills this need.

SUMMARY OF THE INVENTION

In view of the foregoing disadvantages inherent in the known types of augers now present in the prior art, the present invention provides an improved device for dispensing bird seed to an elevated location. As such, the general purpose of the present invention, which will be described subsequently in greater detail, is to provide a new and improved device for dispensing bird seed to an elevated location apparatus and method which has all the advantages of the prior art auger systems and none of the disadvantages.

To attain this, the present invention essentially comprises a new and improved apparatus for dispensing particulant bird seed into an elevated bird feeder comprising, in combination an elongated tubular member having an interior tubular surface and an exterior tubular surface and having a closed lower end and an open upper end with a peripheral surface between about 30 and 60 degrees from the axis of the tubular member to form a lower short side and a long upper side of the tubular member; a rotatable axle extending along essentially the entire length of the tubular member and rotatable about its axis; an auger mounted within the tubular member and secured to the axle for rotation therewith, the flights of the auger having a length of between about 40 and 60 percent of the diameter of the tubular member; a plate located within the tubular member adjacent to the closed lower end to constitute a bearing for the lower end of the axle; a plate secured to long side of the tubular member at the open upper end to constitute a bearing for the upper end of the axle; a motor and activation switch within the tubular member on the side of the plate remote from the auger and adapted to rotate the axle and auger; an opening in the tubular member adjacent to the lower end thereof on the long upper side of the tubular member; a handle located on the long upper side of the tubular member adjacent to the center thereof; and support legs pivotally secured to the tubular member on the short lower side between the center and the lower end for supporting the auger at between about 30 and 60 degrees from the vertical.

In this respect, the device for dispensing bird seed to an elevated location according to the present invention substantially departs from the conventional concepts and designs of the prior art, and in so doing provides an apparatus primarily developed for the purpose of filling elevated bird feeders.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device for dispensing bird seed to an elevated location which has all the advantages of the prior art augers and none of the disadvantages.

It is another object of the present invention to provide a new and improved device for dispensing bird seed to an elevated location which may be easily and efficiently manufactured and marketed.

It is a further object of the present invention to provide a new and improved device for dispensing bird seed to an elevated location which is of a durable and reliable construction.

An even further object of the present invention is to provide a new and improved device for dispensing bird seed to an elevated location which is susceptible of a low cost of manufacture with regard to both materials and labor, and which accordingly is then susceptible of low prices of sale to the consuming public, thereby making such devices for dispensing bird seed to an elevated location economically available to the buying public.

Still yet another object of the present invention is to elevate granular material through an auger system of a simple design.

Yet another object of the present invention is to simplify the filling of elevated bird feeders.

Even still another object of the present invention is to provide a new and improved apparatus for dispensing particulant material to an elevated location comprising an elongated tubular member having interior and exterior surfaces and a closed lower end and an open upper end with its peripheral surface forming an acute angle with respect to the axis of the tubular member to form a lower short side and a long upper side of the tubular member; an auger mounted within the tubular member and secured to the axle for rotation therewith; a plate mounted within the tubular member adjacent to the bottom thereof for rotatable receiving the lower end of the axle and a bearing member adjacent to the top of the tubular member for rotatably receiving the upper end of the axle; a motor within the tubular member on the side of the plate remote from the auger adapted to rotate the axle and auger; and an opening in the auger adjacent to the lower end thereof through the long side of the tubular member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the device for dispensing bird seed to an elevated location constructed in accordance with the principles of the present invention.

FIG. 2 is a perspective view of the upper end of the device of FIG. 1 taken along the line of 2—2 of FIG. 1.

DESCRIPTION OF THE PREFERRED EMBODIMENT

Figure 3:
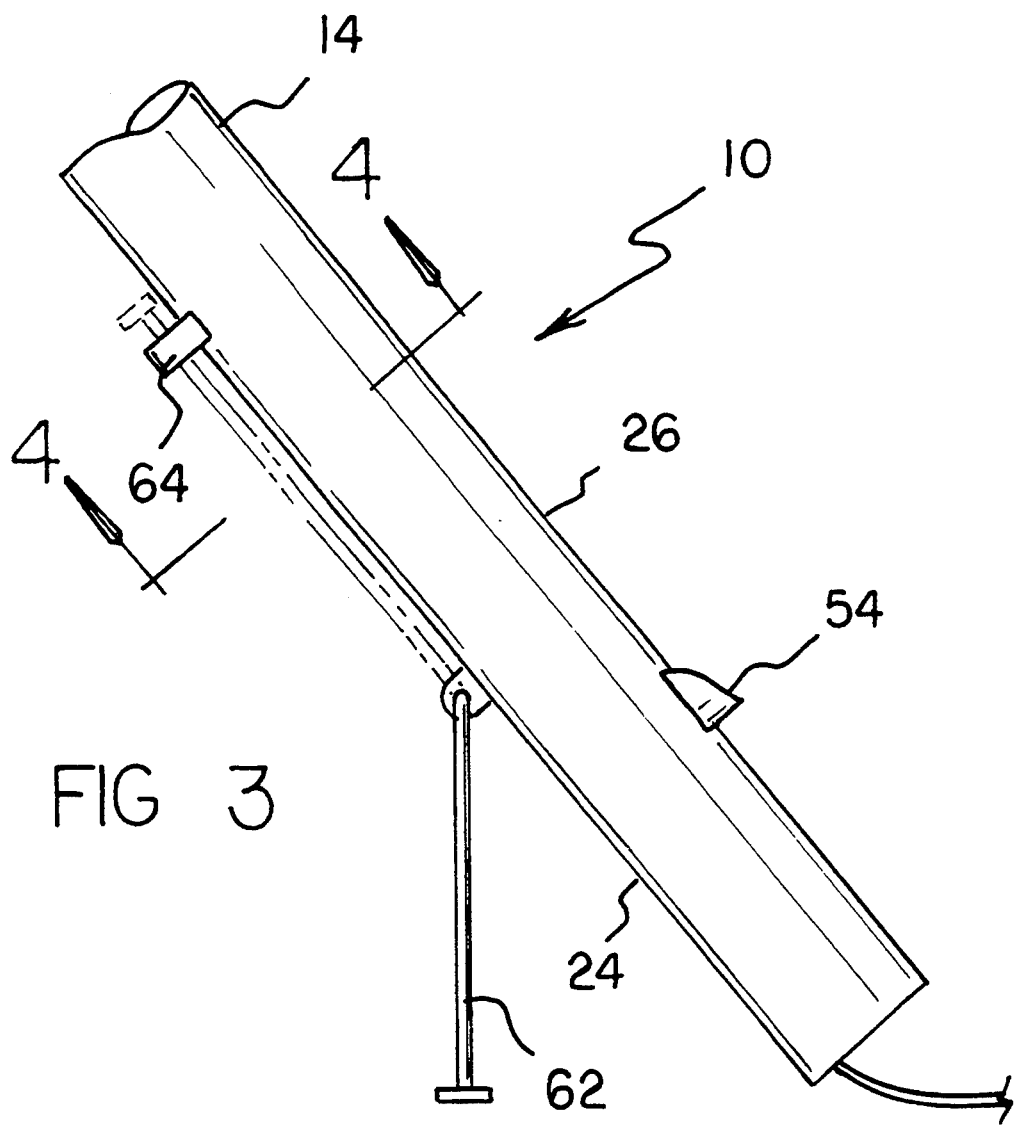
FIG. 3 is a side elevational view of the device of FIG. 1 taken along the line 3—3 of FIG. 1.
Figure 4:
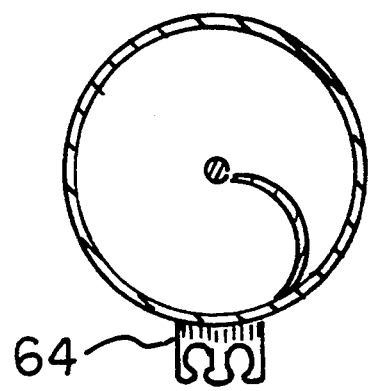
FIG. 4 is a sectional view of the device of the prior Figures taken along line 4—4 of FIG. 3.
Figure 5:
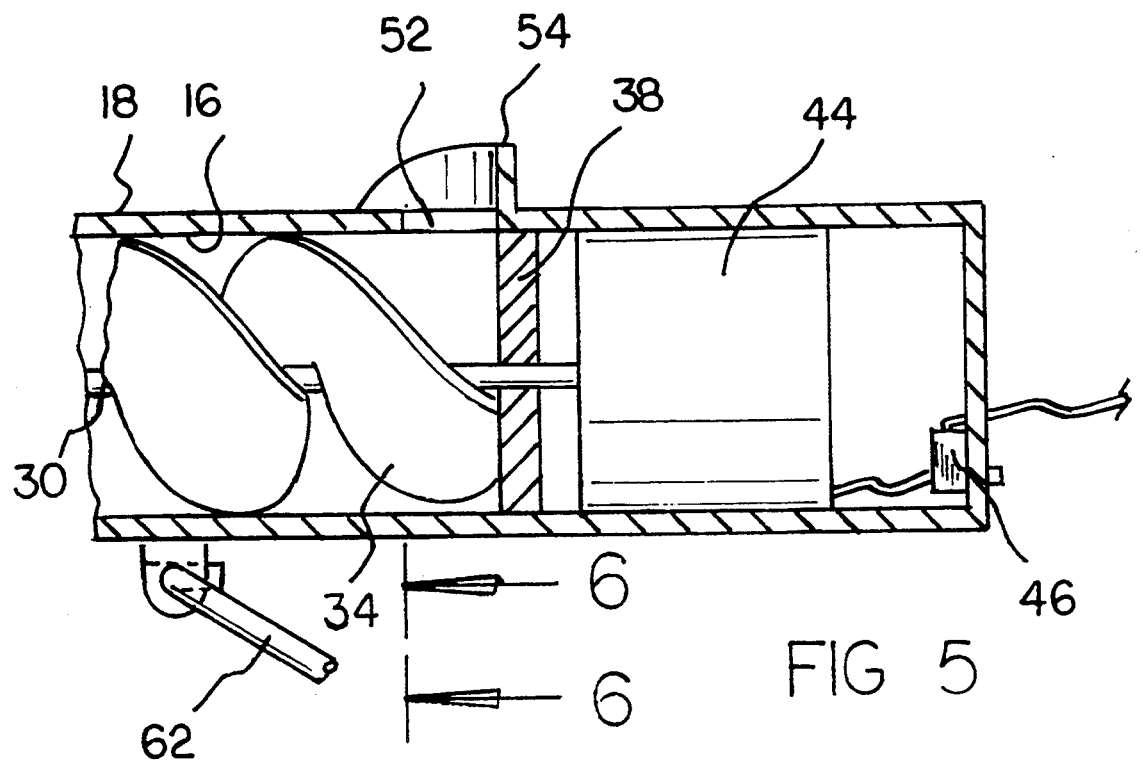
FIG. 5 is a sectional view of the device of the prior Figures taken along line 5—5 of FIG. 1.
Figure 6:
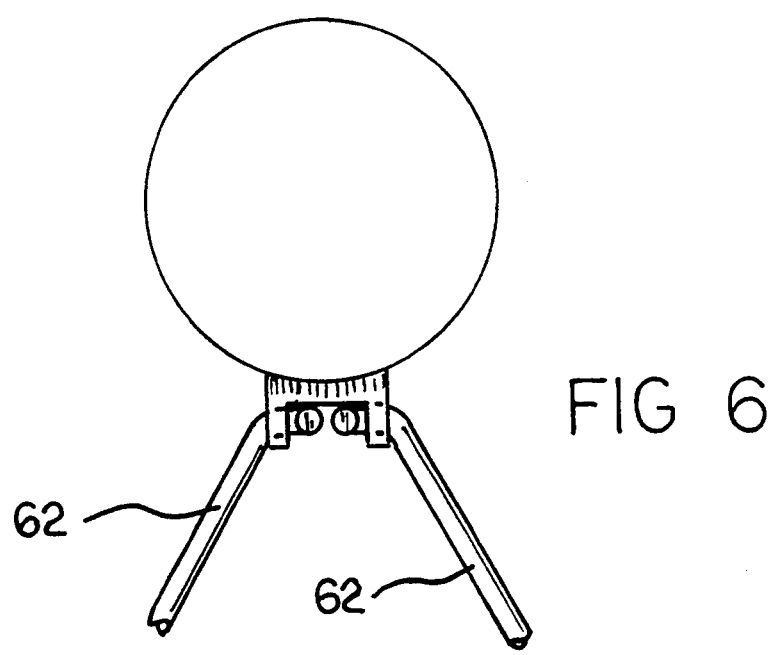
FIG. 6 is a view of the device of the prior Figures taken along line 6—6 of FIG. 5.

With reference now to the drawings, and in particular to FIG. 1 thereof, a new and improved device for dispensing bird seed to an elevated location embodying the principles and concepts of the present invention and generally designated by the reference numeral 10 will be described.

More specifically, it will be noted that FIG. 1 shows the new and improved apparatus 10 for dispensing particulant material, particularly bird seed, into an elevated bird feeder. The apparatus comprises an elongated tubular member 14. The tubular member has an interior tubular surface 16 and an exterior tubular surface 18 with an open upper end 20 and a closed lower end 22. The open upper end has a peripheral surface forming an acute angle of between about 30 and 60 degrees from the axis of the tubular member. This forms a lower short side 24 and a long upper side 26 of the tubular member.

A rotatable axle 30 is located centrally within the tubular member and extends essentially the entire length of the tubular member. Mounted within the tubular member is an auger 34. The auger 34 secured to the shaft 30 for rotation therewith. The diameter of the auger is essentially the same as that of the interior diameter of the tubular member but slightly smaller. The flights have a pitch or length of between about 40 and 60 percent of the diameter of the flights.

A circular plate 38 is mounted within the tubular member adjacent to the lower end thereof. The plate has a central hole for rotatably receiving the lower end of the axle to constitute a bearing surface. A bearing member 40 is secured to upper end of the tubular member at the long side to constitute a bearing surface for the upper end of the axle.

A motor 44 and activation switch 46 are positioned within the tubular member on the side of the plate remote from the auger. The motor is adapted to rotate the axle and auger to move particulate matter from the lower end to the upper end of the tubular member. At the upper end of the tubular member secured to short side is a flange 50 to temporarily secure the tubular member to a feeder which is to receive the fed bird seed.

Located adjacent to the lower end of the tubular member, extending through the long side of the tubular member, is an opening 52 with a lip 54. Bird feed to be fed is poured into the opening 52 to initiate its movement.

A handle 58 is located on the long side of the tubular member adjacent to the center thereof. On the short lower side of the tubular member are support legs 62 located between the center and the lower end for supporting the auger at about between 30 and 60 degrees from the vertical. The legs are pivotally received and a receiving clamp 64 is located adjacent to the center for receiving the legs when pivoted to a position parallel with the tubular member for storage and transportation.

The entire device is preferably fabricated of a rigid material, preferably steel. The device, however, or selected parts thereof, may be fabricated of a rigid plastic material.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved apparatus for dispensing particulant bird seed into an elevated bird feeder comprising, in combination:
    an elongated tubular member having a central axis and having an interior tubular surface and an exterior tubular surface and having a closed lower end and an open upper end with a peripheral surface between about 30 and 60 degrees from the axis of the tubular member to form a lower short side and a long upper side of the tubular member;
    a rotatable axle having a longitudinal axis with an upper end and a lower end and extending along essentially the entire length of the tubular member and rotatable about its axis;
    an auger mounted within the tubular member and secured to the axle for rotation therewith, the flights of the auger having a length of between about 40 and 60 percent of the diameter of the tubular member;
    a first plate located within the tubular member adjacent to the closed lower end to constitute a bearing for the lower end of the axle, the first plate having an upper side and a lower side;
    a second plate secured to the long side of the tubular member at the open upper end to constitute a bearing for the upper end of the axle;
    a motor within the tubular member on the lower side of the first plate remote from the auger and adapted to rotate the axle and auger;
    an opening in the tubular member adjacent to the lower end thereof on the long upper side of the tubular member;
    a handle located on the long upper side of the tubular member adjacent to the center thereof; and
    support legs pivotally secured to the tubular member on the short lower side between the center and the lower end for supporting the auger at between about 30 and 60 degrees from the vertical.

2. Apparatus for dispensing particulant material to an elevated location comprising:
    an elongated tubular member having a central axis and having interior and exterior surfaces and a closed lower end and an open upper end with its peripheral surface forming an acute angle with respect to the axis of the tubular member to form a lower short side and a long upper side of the tubular member;
    a rotatable axle having a longitudinal axis with an upper end and a lower end and extending along essentially the entire length of the tubular member and rotatable about its axis;
    an auger mounted within the tubular member and secured to the axle for rotation therewith;
    a first plate mounted within the tubular member adjacent to the bottom thereof for rotatably receiving the lower end of the axle and a bearing member adjacent to the top of the tubular member for rotatably receiving the upper end of the axle, the first plate having an upper side and a lower side;
    a motor within the tubular member and the lower side of the first plate remote from the auger adapted to rotate the axle and auger;
    an opening in the auger adjacent to the lower end thereof through the long side of the tubular member;
    a handle located on the long side of the tubular member adjacent to the center thereof; and
    support legs rotatably secured to the short lower side of the tubular member between the center and the lower end for supporting the auger at an angle of between about 30 and 60 degrees from the vertical and means to receive the legs in a location parallel with the elongated member when in a storage position.

* * * * *